(12) United States Patent
Kim et al.

(10) Patent No.: US 12,074,287 B2
(45) Date of Patent: Aug. 27, 2024

(54) ELECTROLYTE FOR LITHIUM SECONDARY BATTERY, AND LITHIUM SECONDARY BATTERY INCLUDING SAME

(71) Applicant: SAMSUNG SDI CO., LTD., Yongin-si (KR)

(72) Inventors: Soojin Kim, Yongin-si (KR); Pavel Shatunov, Yongin-si (KR); Sangjae Park, Yongin-si (KR); Hyerim Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 915 days.

(21) Appl. No.: 17/255,169

(22) PCT Filed: Jun. 11, 2019

(86) PCT No.: PCT/KR2019/006974
§ 371 (c)(1),
(2) Date: Dec. 22, 2020

(87) PCT Pub. No.: WO2020/009340
PCT Pub. Date: Jan. 9, 2020

(65) Prior Publication Data
US 2021/0265662 A1 Aug. 26, 2021

(30) Foreign Application Priority Data
Jul. 6, 2018 (KR) .................. 10-2018-0079030

(51) Int. Cl.
*H01M 10/0567* (2010.01)
*H01M 10/0525* (2010.01)
(Continued)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0028* (2013.01)

(58) Field of Classification Search
CPC .................................................. H01M 10/0567
(Continued)

(56) References Cited

U.S. PATENT DOCUMENTS

2004/0137333 A1* 7/2004 Nishiyama ........ H01M 10/0525
429/340
2006/0236528 A1 10/2006 Xu et al.
(Continued)

FOREIGN PATENT DOCUMENTS

JP 2012-531714 A 12/2012
KR 10-2015-0022657 A 3/2015
(Continued)

OTHER PUBLICATIONS

International Search Report dated Sep. 19, 2019.

*Primary Examiner* — James M Erwin
(74) *Attorney, Agent, or Firm* — Lee IP Law, P.C.

(57) ABSTRACT

This disclosure relates to an electrolyte for a lithium secondary battery and a lithium secondary battery including the same.

For example, the electrolyte for a lithium secondary battery includes a non-aqueous organic solvent, a lithium salt, and an additive, wherein the additive includes at least one borate-based lithium salt selected from lithium tetrafluoroborate (LiBF$_4$), lithium bis(oxalate)borate (LiBOB), lithium difluoro(oxalato)borate (LiFOB), lithium bis(2-methyl-2-fluoro-malonato)borate, and a combination thereof; and a compound represented by Chemical Formula 1.

The detailed description of Chemical Formula 1 is the same as that defined in the specification.

8 Claims, 1 Drawing Sheet

(51) Int. Cl.
*H01M 10/0568* (2010.01)
*H01M 10/0569* (2010.01)

(58) Field of Classification Search
USPC .......................................... 429/322
See application file for complete search history.

(56) References Cited

U.S. PATENT DOCUMENTS

| | | |
|---|---|---|
| 2010/0119956 A1 | 5/2010 | Tokuda et al. |
| 2011/0008680 A1 | 1/2011 | Muldoon et al. |
| 2016/0013517 A1 | 1/2016 | Nakazawa et al. |
| 2016/0020488 A1 | 1/2016 | Cho et al. |
| 2018/0048025 A1* | 2/2018 | Jilek ................... H01M 10/052 |
| 2018/0159176 A1* | 6/2018 | Cheng ................... H01M 10/05 |

FOREIGN PATENT DOCUMENTS

| | | |
|---|---|---|
| KR | 10-2015-0022659 A | 3/2015 |
| KR | 10-2015-0135278 A | 12/2015 |
| KR | 10-2016-0009399 A | 1/2016 |
| KR | 10-2017-0034313 A | 3/2017 |
| KR | 10-2017-0034333 A | 3/2017 |
| WO | WO 2006-115737 A1 | 11/2006 |
| WO | WO 2008-126800 A1 | 10/2008 |

\* cited by examiner

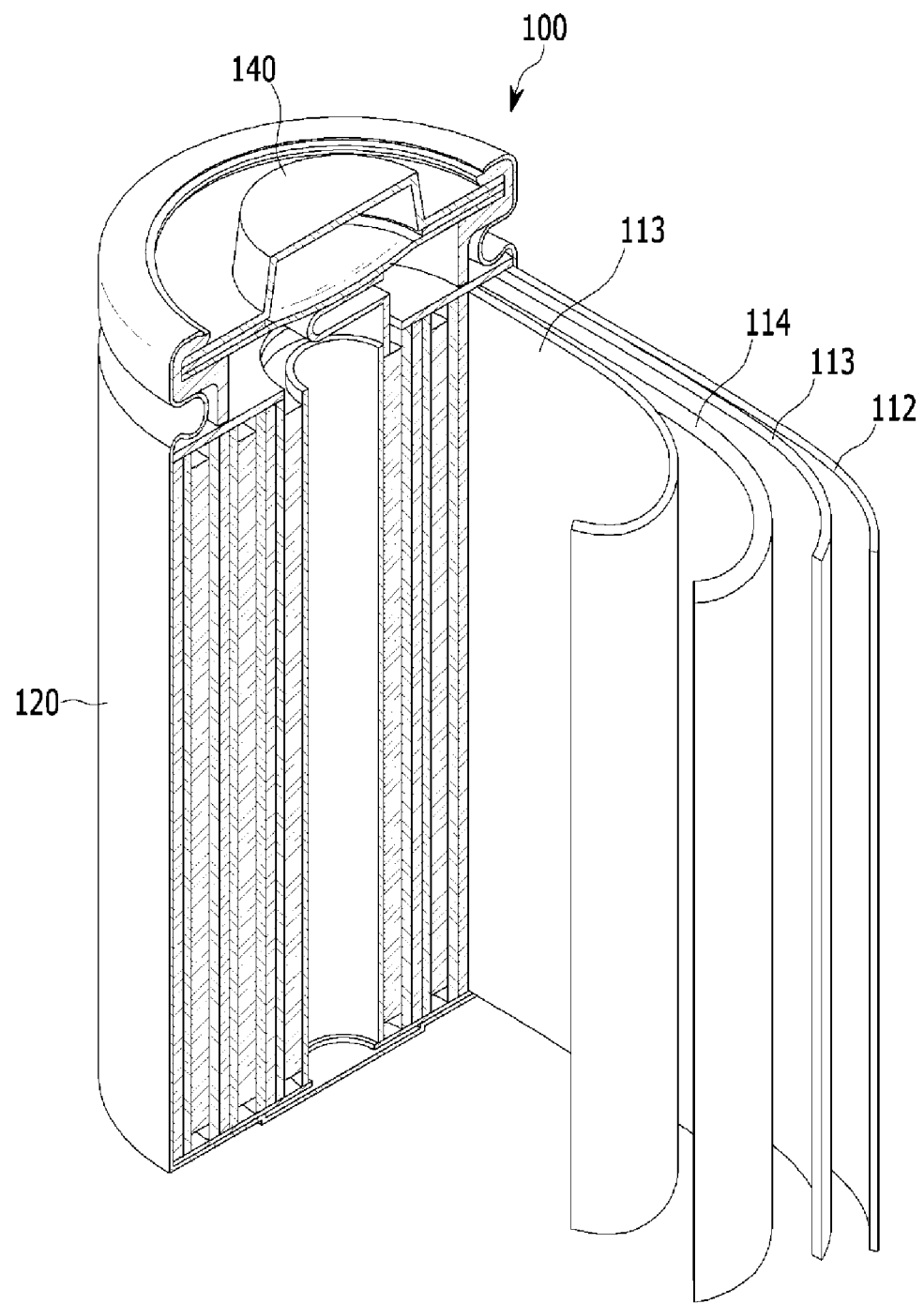

ELECTROLYTE FOR LITHIUM SECONDARY BATTERY, AND LITHIUM SECONDARY BATTERY INCLUDING SAME

CROSS REFERENCE TO RELATED APPLICATIONS

This is the U.S. national phase application based on PCT Application No. PCT/KR2019/006974, filed Jun. 11, 2019, which is based on Korean Patent Application No. 10-2018-0079030, filed Jul. 6, 2018, the entire contents of all of which are hereby incorporated by reference.

TECHNICAL FIELD

An electrolyte for a lithium secondary battery and a lithium secondary battery including the same are disclosed.

BACKGROUND ART

A lithium secondary battery may be recharged and has three or more times as high energy density per unit weight as a conventional lead storage battery, nickel-cadmium battery, nickel hydrogen battery, nickel zinc battery and the like. It may be also charged at a high rate and thus, is commercially manufactured for a laptop, a cell phone, an electric tool, an electric bike, and the like, and researches on improvement of additional energy density have been actively made.

Such a lithium secondary battery is manufactured by injecting an electrolyte into a battery cell, which includes a positive electrode including a positive active material capable of intercalating/deintercalating lithium ions and a negative electrode including a negative active material capable of intercalating/deintercalating lithium ions.

Particularly, an electrolyte includes an organic solvent in which a lithium salt is dissolved and critically determines stability and performance of a lithium secondary battery.

$LiPF_6$ that is most commonly used as a lithium salt of an electrolyte has a problem of reacting with an electrolytic solvent to promote depletion of a solvent and generate a large amount of gas. When $LiPF_6$ is decomposed, it generates LiF and $PF_5$, which leads to electrolyte depletion in the battery, resulting in degradation in high temperature performance and poor safety.

There are needs for an electrolyte which suppresses side reactions of such a lithium salt and improves the performance of the battery.

DISCLOSURE

Technical Problem

An embodiment provides an electrolyte for a lithium secondary battery capable of ensuring high-temperature stability and improving resistance characteristics and cycle-life characteristics and thus improving battery performance.

Another embodiment provides a lithium secondary battery including the electrolyte for a lithium secondary battery.

Technical Solution

An embodiment of the present invention provides an electrolyte for a lithium secondary battery including a non-aqueous organic solvent, a lithium salt, and an additive, wherein the additive includes at least one borate-based lithium salt selected from lithium tetrafluoroborate ($LiBF_4$), lithium bis(oxalate)borate (LiBOB), lithium difluoro(oxalato)borate (LiFOB), lithium bis(2-methyl-2-fluoro-malonato)borate, and a combination thereof; and a compound represented by Chemical Formula 1.

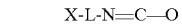  [Chemical Formula 1]

In Chemical Formula 1,

L is a single bond, O, S, $SO_2$, a substituted or unsubstituted C1 to C20 alkylene group, a substituted or unsubstituted C2 to C20 alkenylene group, a substituted or unsubstituted C2 to C20 alkynylene group, a substituted or unsubstituted C6 to C30 arylene group, a substituted or unsubstituted C2 to C30 heteroarylene group, or a combination thereof, X is $Si(R^1)(R^2)(R^3)$ or $R^4—SO_2$, and $R^1$ to $R^4$ are independently hydrogen, deuterium, a halogen, a cyano group, an isocyanate group, a substituted or unsubstituted C1 to C20 alkyl group, a substituted or unsubstituted C1 to C20 alkoxy group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C1 to C30 alkylsilyl group, a substituted or unsubstituted C1 to C30 alkylsilyloxy group, a substituted or unsubstituted C6 to C30 aryl group, a substituted or unsubstituted C2 to C30 heteroaryl group, or a combination thereof.

$R^1$ to $R^4$ may independently be a halogen, a cyano group, an isocyanate group, a substituted or unsubstituted C1 to C20 alkyl group, a substituted or unsubstituted C1 to C20 alkoxy group, a substituted or unsubstituted C3 to C20 cycloalkyl group, a substituted or unsubstituted C1 to C30 alkylsilyl group, or a substituted or unsubstituted C1 to C30 alkylsilyloxy group.

The compound represented by Chemical Formula 1 may be one selected from fluorosulfonyl isocyanate, sulfuryl diisocyanate, trimethylsilyl isocyanate, 3-(triethoxysilyl)propyl isocyanate, 1,3-diisocyanato-1,1,3,3-tetramethyldisiloxane), and a combination thereof.

The borate-based lithium salt may be included in an amount of 0.05 wt % to 20 wt % based on a total amount of the electrolyte and the compound represented by Chemical Formula 1 may be included in an amount of 0.05 wt % to 10 wt % based on a total amount of the electrolyte.

The compound represented by Chemical Formula 1 may be included in an amount of 1 to 20 parts by weight based on 100 parts by weight of the borate-based lithium salt.

The additive may further include at least one additional additive selected from vinylethylene carbonate (VEC), fluoroethylene carbonate (FEC), propenesultone (PST), propanesultone (PS), lithium tetrafluoroborate ($LiBF_4$), lithium bis(oxalato)borate (LiBOB), succinonitrile (SN), lithium difluorophosphate ($LiPO_2F_2$), 2-fluoro biphenyl (2-FBP), and a combination thereof.

The additional additive may be included in an amount of 0.1 wt % to 10 wt % based on a total amount of the electrolyte for a lithium secondary battery.

Another embodiment provides a lithium secondary battery including a positive electrode; a negative electrode; and the electrolyte.

Advantageous Effects

It is possible to implement a lithium secondary battery having excellent high-temperature storage characteristics and improved resistance characteristics and cycle-life characteristics.

DESCRIPTION OF THE DRAWINGS

FIG. 1 is a schematic view showing a lithium secondary battery according to an embodiment of the present invention.

DESCRIPTION OF SYMBOLS

100: lithium secondary battery
112: negative electrode
113: separator
114: positive electrode
120: battery case
140: sealing member

MODE FOR INVENTION

Hereinafter, embodiments of the present invention are illustrated in detail. However, these embodiments are exemplary, the present invention is not limited thereto and the present invention is defined by the scope of claims.

In the present specification, when a definition is not otherwise provided, 'substituted' refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

In the present specification, when a definition is not otherwise provided, the term 'hetero' refers to one including 1 to 3 heteroatoms selected from N, O, S, and P.

Hereinafter, an electrolyte for a lithium secondary battery according to an embodiment is described.

An electrolyte for a lithium secondary battery according to an embodiment includes a non-aqueous organic solvent, a lithium salt, and an additive,
wherein the additive includes at least one borate-based lithium salt selected from lithium tetrafluoroborate (LiBF$_4$), lithium bis(oxalate)borate (LiBOB), lithium difluoro(oxalato)borate (LiFOB), lithium bis(2-methyl-2-fluoro-malonato)borate, and a combination thereof; and a compound represented by Chemical Formula 1.

　　　　　　　　　　　　　[Chemical Formula 1]

In Chemical Formula 1,
L is a single bond, O, S, SO$_2$, a substituted or unsubstituted C1 to C20 alkylene group, a substituted or unsubstituted C2 to C20 alkenylene group, a substituted or unsubstituted C2 to C20 alkynylene group, a substituted or unsubstituted C6 to C30 arylene group, a substituted or unsubstituted C2 to C30 heteroarylene group, or a combination thereof, X is Si(R$^1$)(R$^2$)(R$^3$) or R$^4$—SO$_2$, and
R$^1$ to R$^4$ are independently hydrogen, deuterium, a halogen, a cyano group, an isocyanate group, a substituted or unsubstituted C1 to C20 alkyl group, a substituted or unsubstituted C1 to C20 alkoxy group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C1 to C30 alkylsilyl group, a substituted or unsubstituted C1 to C30 alkylsilyloxy group, a substituted or unsubstituted C6 to C30 aryl group, a substituted or unsubstituted C2 to C30 heteroaryl group, or a combination thereof.

When a combination of the borate-based lithium salt and the compound represented by Chemical Formula 1 is used according to an embodiment of the present invention, an adsorptive and reactive SEI (solid electrolyte interface) film having excellent ion conductivity may be formed on the surface of the negative electrode to suppress thermal decomposition of LiPF$_6$ and reduce a decomposition reaction of the electrolyte during the storage at a high temperature and thus improve high temperature stability, a battery internal resistance decrease, and low temperature cycle-life characteristics.

In an embodiment, R$^1$ to R$^4$ may independently be a halogen, a cyano group, an isocyanate group, a substituted or unsubstituted C1 to C20 alkyl group, a substituted or unsubstituted C1 to C20 alkoxy group, a substituted or unsubstituted C3 to C20 cycloalkyl group, a substituted or unsubstituted C1 to C30 alkylsilyl group, or a substituted or unsubstituted C1 to C30 alkylsilyloxy group.

For example, R$^1$ to R$^3$ may independently be a halogen, a cyano group, an isocyanate group, a substituted or unsubstituted C1 to C20 alkyl group, a substituted or unsubstituted C1 to C20 alkoxy group, or a substituted or unsubstituted C1 to C30 alkylsilyloxy group, and
R$^4$ may be a halogen, a cyano group, an isocyanate group, or a substituted or unsubstituted C1 to C20 alkyl group.

In a specific embodiment the compound represented by Chemical Formula 1 may be one selected from fluorosulfonyl isocyanate, sulfuryl diisocyanate, trimethylsilyl isocyanate, 3-(triethoxysilyl)propyl isocyanate, 1,3-diisocyanato-1,1,3,3-tetramethyldisiloxane), and a combination thereof, but is not limited thereto.

The borate-based lithium salt may be included in an amount of 0.05 wt % to 20 wt % based on a total amount of the electrolyte and the compound represented by Chemical Formula 1 may be included in an amount of 0.05 wt % to 10 wt % based on a total amount of the electrolyte.

In an embodiment, the borate-based lithium salt may be included in an amount of 0.1 wt % to 20 wt % based on a total amount of the electrolyte and the compound represented by Chemical Formula 1 may be included in an amount of 0.05 wt % to 5 wt % based on a total amount of the electrolyte.

For example, the borate-based lithium salt may be included in an amount of 0.1 wt % to 10 wt % based on a total amount of the electrolyte and the compound represented by Chemical Formula 1 may be included in an amount of 0.05 wt % to 1 wt % based on a total amount of the electrolyte.

When the borate-based lithium salt is included within the contents, an SEI film having low resistance and excellent thermal stability may be formed and thus effectively suppress the electrolyte decomposition reaction.

In other words, when the borate-based lithium salt is used in an amount of less than 0.05 wt %, the effect of suppressing the interface resistance increase may be insignificant, but when the borate-based lithium salt is used in an amount of greater than 20 wt %, viscosity and interface resistance may be increased, and accordingly, there may be a problem of not securing capacity and battery performance such as a cycle-life and the like, and when the compound represented by Chemical Formula 1 is included in an amount of less than 0.05 wt %, there may be a problem of deteriorating the effect of improving high temperature storage and swelling, but when the compound represented by Chemical Formula 1 is included in an amount of greater than 10 wt %, there may be a problem of deteriorating the battery performance due to the dissociation state change of the lithium salt and the interface resistance increase.

In an embodiment, the compound represented by Chemical Formula 1 may be included in an amount of 1 to 20 parts by weight, for example 1 to 10 parts by weight based on 100 parts by weight of the borate-based lithium salt.

When the compound represented by Chemical Formula 1 is included in the aforementioned content, the material may be absorbed on the surface of the active material and thus form SEI film having excellent Lit ion transfer properties before the reduction decomposition of the additives.

On the other hand, the additive may further include at least one additional additive selected from vinylethylene carbonate (VEC), fluoroethylene carbonate (FEC), propenesultone (PST), propanesultone (PS), lithium tetrafluoroborate (LiBF$_4$), lithium bis(oxalato)borate (LiBOB), succinonitrile (SN), lithium difluorophosphate (LiPO$_2$F$_2$), 2-fluoro biphenyl (2-FBP), and a combination thereof.

The additional additive may be included in an amount of 0.1 wt % to 10 wt %, for example 0.5 wt % to 5 wt % based on a total amount of the electrolyte for the lithium secondary battery.

When the additional additive is included within the range, battery resistance may be effectively suppressed, and a lithium secondary battery having much excellent cycle-life characteristics may be realized.

For example, in order to improve cycle-life of a battery, vinylene carbonate or an ethylene-based carbonate-based compound represented by Chemical Formula 2 may be included as an additive for improving cycle-life.

[Chemical Formula 2]

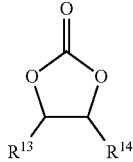

In Chemical Formula 2, $R^{13}$ and $R^{14}$ are the same as or different from each other, and are selected from hydrogen, a halogen group, a cyano group (CN), a nitro group (NO$_2$), and a fluorinated alkyl group having 1 to 5 carbon atoms, and at least one of $R^{13}$ and $R^{14}$ is selected from a halogen group, a cyano group (CN), a nitro group (NO$_2$), and a fluorinated alkyl group having 1 to 5 carbon atoms, provided that both $R^{13}$ and $R^{14}$ are not hydrogen.

Examples of the ethylene-based carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The non-aqueous organic solvent serves as a medium for transmitting ions taking part in the electrochemical reaction of a battery.

The non-aqueous organic solvent may be a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, propylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may include cyclohexanone, and the like. The alcohol-based solvent may include ethanol, isopropyl alcohol, and the like and the aprotic solvent may include nitriles such as R—CN (wherein R is a hydrocarbon group having a C2 to C20 linear, branched, or cyclic structure and may include a double bond, an aromatic ring, or an ether bond), and the like, dioxolanes such as 1,3-dioxolane, and the like, sulfolanes, and the like.

The non-aqueous organic solvent may be used alone or in a mixture, and when the organic solvent is used in a mixture, the mixture ratio may be controlled in accordance with a desirable battery performance.

The carbonate-based solvent is prepared by mixing a cyclic carbonate and a linear carbonate. When the cyclic carbonate and linear carbonate are mixed together in a volume ratio of 1:1 to 1:9, an electrolyte performance may be improved.

The non-aqueous organic solvent may further include an aromatic hydrocarbon-based organic solvent in addition to the carbonate based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 3.

[Chemical Formula 3]

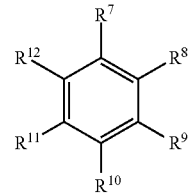

In Chemical Formula 3, $R^7$ to $R^{12}$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3- diiodotoluene, 2,4-diiodotoluene, 2,5-diiodotoluene, 2,3,4-triiodotoluene, 2,3,5-triiodotoluene, xylene, and a combination thereof.

The lithium salt dissolved in the non-organic solvent supplies lithium ions in a battery, enables a basic operation of a lithium secondary battery, and improves transportation of the lithium ions between positive and negative electrodes. Examples of the lithium salt include at least one supporting salt selected from $LiPF_6$, $LiBF_4$, $LiSbF_6$, $LiAsF_6$, $LIN(SO_2C_2F_5)_2$, $Li(CF_3SO_2)_2N$, $LIN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer ranging from 1 to 20), LiCl, LiI and $LiB(C_2O_4)_2$ (lithium bis(oxalato) borate; LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment provides a lithium secondary battery including a positive electrode; a negative electrode; and the electrolyte.

The positive electrode includes a current collector and a positive active material layer disposed on the current collector and including a positive active material.

The positive active material may include lithiated intercalation compounds that reversibly intercalate and deintercalate lithium ions.

Specifically, at least one composite oxide of lithium and a metal of cobalt, manganese, nickel, or a combination thereof may be used.

Examples of the positive active material may be a compound represented by one of chemical formulas.

$Li_aA_{1-b}X_bD_2$ ($0.90 \le a \le 1.8$, $0 \le b \le 0.5$); $Li_aA_{1-b}X_6O_{2-c}D_c$ ($0.90 \le a \le 1.8$, $0 \le b \le 0.5$, $0 \le c \le 0.05$); $Li_aE_{1-b}X_6O_2D_c$ ($0.90 \le a \le 1.8$, $0 \le b \le 0.5$, $0 \le c \le 0.05$); $Li_aE_{2-b}X_6O_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Co_bX_cO_{2-\alpha}T_2$ ($0.90 \le a \le 1.8$, $0 \le b \le 0.5$, $0 \le c \le 0.05$, $0 \le \alpha \le 2$); $Li_aNi_{1-b-c}Mn_bX_cD_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$).

In chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method (e.g., spray coating, dipping, etc.), but is not illustrated in more detail since it is well-known to those skilled in the related field.

Specific examples of the positive active material according to an embodiment may be $Li_xNi_yCo_zAl_{1-y-z}O_2$ ($1 \le x \le 1.2$, $0.5 \le y \le 1$, and $0 \le z \le 0.5$), or $Li_xNi_yCo_zMn_{1-y-z}O_2$ ($1 \le x \le 1.2$, $0.5 \le y \le 1$, and $0 \le z \le 0.5$).

The positive active material may be included in an amount of 90 wt % to 98 wt % based on the total weight of the positive active material layer.

In an embodiment of the present invention, the positive active material layer may include a binder and a conductive material. Herein, the binder and the conductive material may be included in an amount of 1 wt % to 5 wt % based on the total weight of the positive active material layer, respectively.

The binder plays a role of adhering positive active material particles one another and in addition, the positive active material particles to a current collector, and examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material is included to provide electrode conductivity, any electrically conductive material may be used as a conductive material unless it causes a chemical change, and examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use Al, but is not limited thereto.

The negative electrode includes a current collector and a negative active material layer formed on the current collector and including a negative active material.

The negative active material may include a material that reversibly intercalates/deintercalates lithium ions, a lithium metal, a lithium metal alloy, a material being capable of doping/dedoping lithium, or transition metal oxide.

The material that reversibly intercalates/deintercalates lithium ions may include a carbon material, the carbon material may be any generally-used carbon-based negative active material in a lithium ion secondary battery, and examples thereof may be crystalline carbon, amorphous carbon, or a mixture thereof. The crystalline carbon may be non-shaped, or sheet, flake, spherical, or fiber shaped natural graphite or artificial graphite and the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may be Si, Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, Sn—R (wherein R is an element selected from an alkali metal, an alkaline-earth metal, a Group 13 element, a Group 14 element, a Group 15 element, a Group 16 element, a transition metal, a rare earth element, and a combination thereof, and not Sn), and the like and at least one of these materials may be mixed with $SiO_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative active material layer, the negative active material may be included in an amount of 95 wt % to 99 wt % based on the total weight of the negative active material layer.

In an embodiment of the present invention, the negative active material layer includes a binder, and optionally a conductive material. In the negative active material layer, a content of the binder may be 1 wt % to 5 wt % based on a total weight of the negative active material layer. When the negative active material layer includes a conductive material, the negative active material layer includes 90 wt % to 98 wt % of the negative active material, 1 wt % to 5 wt % of the binder, and 1 wt % to 5 wt % of the conductive material.

The binder improves binding properties of negative active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, ethylenepropylenecopolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as a negative electrode binder, a cellulose-based compound as a thickener may be further used to provide viscosity. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of 0.1 to 3 parts by weight based on 100 parts by weight of the negative active material.

The conductive material is included to provide electrode conductivity, any electrically conductive material may be used as a conductive material unless it causes a chemical change, and examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

Depending on the type of lithium secondary battery, a separator may exist between the positive electrode and the negative electrode. Such a separator may use polyethylene, polypropylene, polyvinylidene fluoride or multi-layers of these two or more, such as mixed multi-layers of a polyethylene/polypropylene double-layered separator, a polyethylene/polypropylene/polyethylene triple-layered separator, a polypropylene/polyethylene/polypropylene triple-layered separator, and the like.

Referring to FIG. 1, a lithium secondary battery 100 according to an embodiment includes a battery cell including a negative electrode 112, a positive electrode 114 facing the negative electrode 112, a separator 113 interposed between the negative electrode 112 and the positive electrode 114, and an electrolyte 113 (not shown) for a lithium secondary battery impregnating the negative electrode 112, the positive electrode 114, and the separator 113, a battery case 120 housing the battery cell, and a sealing member 140 sealing the battery case 120.

DETAILED DESCRIPTION OF THE EMBODIMENTS

Hereinafter, examples of the present invention and comparative examples are described. These examples, however, are not in any sense to be interpreted as limiting the scope of the invention.

Manufacture of Lithium Secondary Battery

Example 1

$LiNi_{0.6}Co_{0.2}Mn_{0.2}O_2$ as a positive active material, polyvinylidene fluoride as a binder, and ketjen black as a conductive material were mixed in a weight ratio of 96:2:2 and then, dispersed in N-methyl pyrrolidone to prepare positive active material slurry.

The positive active material slurry was coated on a 12 μm-thick Al foil, dried at 100° C., and pressed to manufacture a positive electrode.

Graphite as a negative active material, polyvinylidene fluoride as a binder, and ketjen black as a conductive material were mixed in a weight ratio of 97:2:1 and then, dispersed in N-methyl pyrrolidone to prepare negative active material slurry.

The negative active material slurry was coated on a 8 μm thick Cu foil, dried at 100° C., and pressed to manufacture a negative electrode.

The positive and negative electrodes, a 25 μm-thick polyethylene separator, and an electrolyte were used to manufacture a lithium secondary battery cell.

The electrolyte has a following composition.
(Electrolyte Composition)
  Salt: LiPF$_6$ 1.25 M
  Solvent: ethylene carbonate/ethylmethyl carbonate/dimethyl carbonate (EC:EMC:DMC=volume ratio of 20:35:45)
  Additive: LiBF$_4$ 5 wt %/fluorosulfonyl isocyanate 0.3 wt %
  (Herein, in the electrolyte composition, "wt %" is based on a total amount of an electrolyte (a lithium salt+a non-aqueous organic solvent+an additive))

Example 2

A lithium secondary battery cell was manufactured according to the same method as Example 1 except that LiBOB was used instead of the LiBF$_4$.

Example 3

A lithium secondary battery cell was manufactured according to the same method as Example 1 except that LiFOB was used instead of the LiBF$_4$.

Comparative Example 1

A lithium secondary battery cell was manufactured according to the same method as Example 1 except that LiBF$_4$ and fluorosulfonyl isocyanate as an additive were not added.

Comparative Example 2

A lithium secondary battery cell was manufactured according to the same method as Example 1 except that the fluorosulfonyl isocyanate as an additive was not added.

Comparative Example 3

A lithium secondary battery cell was manufactured according to the same method as Example 2 except that the fluorosulfonyl isocyanate as an additive was not added.

Comparative Example 4

A lithium secondary battery cell was manufactured according to the same method as Example 3 except that the fluorosulfonyl isocyanate as an additive was not added.

Comparative Example 5

A lithium secondary battery cell was manufactured according to the same method as Example 1 except that LiBF$_4$ as an additive was not added.

Comparative Example 6

A lithium secondary battery cell was manufactured according to the same method as Example 1 except that 0.3 wt % of trimethylsilyl isocyanate was used instead of the additive of Example 1.

Comparative Example 7

A lithium secondary battery cell was manufactured according to the same method as Example 1 except that 5 wt % of lithium malonate difluoro borate (LiMDFB) was used instead of the additive of Example 1.

Comparative Example 8

A lithium secondary battery cell was manufactured according to the same method as Example 1 except that 5 wt % of lithium malonate difluoro borate (LiMDFB) and 0.3 wt % of trimethylsilyl isocyanate were used instead of the additive of Example 1.

Battery Characteristics Evaluation
Evaluation 1: Measurement of Initial DC-IR

Each lithium secondary battery cell according to Examples 1 to 3 and Comparative Examples 1 to 8 was discharged at a constant current of 0.1 C and then, at a constant current of 1 C, respectively, for 10 seconds in a 50% charge state.

Initial DC resistance (DC-IR) of each cell was calculated by using 10 s discharge data at 1 C and 5 C according to $\Delta R=\Delta V/\Delta I$, and the results are shown in Table 1.

Evaluation 2: Evaluation of High Temperature Cycle-Life Characteristics

The lithium secondary battery cells according to Examples 1 to 3 and Comparative Examples 1 to 8 were charged under CC-CV 4 A, 4.25 V, and ¹⁄₂₀ C cut-off at 80° C. and then, discharged under CC 1 A and 3 V cut-off, which was regarded as one cycle, and after repeating 500 cycles, the cycle-life characteristics thereof were evaluated to provide capacity retentions in Table 1.

Evaluation 3: Evaluation of High Temperature Storage Stability

Each lithium secondary battery cell according to Examples 1 to 3 and Comparative Examples 1 to 8 was evaluated with respect to a resistance increase rate when allowed to stand at a high temperature of 80° C. after repeating the 500 cycles in a state of charge (SOC=80%) at 80° C., and the results are shown in Table 1.

An initial formation condition was to discharge down to 2.6 V after CC charge up to 3.6 V at a current of 0.2 C at the first cycle and then, to discharge down to 2.6 V after charging up to 4.25 V at a current of 0.2 C at the second cycle, and accordingly, an oxide film was formed on the surface of an electrode.

Initial capacity and capacity after the 500 cycles were obtained by measuring 3 V cut-off discharge capacity at a current of 3 C after the CC-CV charge up to 4.25 V at a current of 1 C.

Capacity retention (%) was obtained as a percentage of the capacity after the 500 cycles relative to the initial capacity.

DC resistance (DC-IR) was measured as follows.

The DC resistance (DC-IR) was calculated from each current difference and voltage difference when different currents were applied.

The DC resistance (DC-IR) was calculated according to $\Delta R=\Delta V/\Delta I$ from 10 s discharge data of 1 C and 5C in SOC 50%.

A resistance increase rate (%) was obtained as a percentage of DC-IR after the 500 cycles relative to the initial DC-IR.

Evaluation 4: Evaluation of Low-temperature Operation Time

Time taken until battery cells were charged up to 4.25 V in SOC 100% at room temperature and then, discharged at a rate of 8 C down to 2.1 V after allowed to stand at −30° C. for 6 hrs was measured, and the results are shown in Table 1.

TABLE 1

|  | Initial DC-IR (25° C., mΩ) | Capacity retention after 500 cycles (80° C., %) | Resistance increase rate after 500 cycles (80° C., %) | Low-temperature operation time (−30° C., sec) |
| --- | --- | --- | --- | --- |
| Example 1 | 85.9 | 79.0 | 137 | 21.3 |
| Example 2 | 86.2 | 83.6 | 181 | 23.8 |
| Example 3 | 86.6 | 79.8 | 202 | 20.0 |
| Comparative Example 1 | 87.7 | 76.7 | 342 | 14.2 |
| Comparative Example 2 | 110.5 | 79.0 | 239 | 8.8 |
| Comparative Example 3 | 129.8 | 84.4 | 205 | 9.3 |
| Comparative Example 4 | 114.0 | 83.6 | 232 | 11.2 |
| Comparative Example 5 | 87.6 | 76.5 | 236 | 14.6 |
| Comparative Example 6 | 87.5 | 75.2 | 297 | 15.0 |
| Comparative Example 7 | 115.2 | 78.4 | 142 | 9.5 |
| Comparative Example 8 | 86.4 | 77.8 | 294 | 19.8 |

Referring to Table 1, the lithium secondary battery cells of Examples 1 to 3 including the additive according to an embodiment exhibited all improved initial DC-resistance, extremely high temperature cycle-life characteristic, an extremely high temperature DC-resistance increase rate, and low temperature operation time, and the like, compared with the lithium secondary battery cells according to Comparative Examples 1 to 8.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. An electrolyte for a lithium secondary battery, comprising:
    a non-aqueous organic solvent,
    a lithium salt, and
    an additive,
    wherein the additive includes:
        a borate-based lithium salt, the borate-based lithium salt including lithium tetrafluoroborate (LiBF$_4$), lithium bis(oxalate)borate (LiBOB), lithium difluoro (oxalato)borate (LiFOB), lithium bis(2-methyl-2-fluoro-malonato)borate, or a combination thereof; and
        a compound represented by Chemical Formula 1, provided that the compound represented by Chemical Formula 1 is not trimethylsilyl isocyanate:

X-L-N=C=O        [Chemical Formula 1]

wherein, in Chemical Formula 1,
    L is a single bond, O, S, SO$_2$, a substituted or unsubstituted C1 to C20 alkylene group, a substituted or unsubstituted C2 to C20 alkenylene group, a substituted or unsubstituted C2 to C20 alkynylene group, a substituted or unsubstituted C6 to C30 arylene group, a substituted or unsubstituted C2 to C30 heteroarylene group, or a combination thereof, X is Si(R$^1$)(R$^2$)(R$^3$) or R$^4$—SO$_2$, and
    R$^1$ to R$^4$ are independently hydrogen, deuterium, a halogen, a cyano group, an isocyanate group, a substituted or unsubstituted C1 to C20 alkyl group, a substituted or unsubstituted C1 to C20 alkoxy group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C1 to C30 alkylsilyl group, a substituted or unsubstituted C1 to C30 alkylsilyloxy group, a substituted or unsubstituted C6 to C30 aryl group, a substituted or unsubstituted C2 to C30 heteroaryl group, or a combination thereof.

2. The electrolyte for a lithium secondary battery of claim 1, wherein R$^1$ to R$^4$ are independently a halogen, a cyano group, an isocyanate group, a substituted or unsubstituted C1 to C20 alkyl group, a substituted or unsubstituted C1 to C20 alkoxy group, a substituted or unsubstituted C3 to C20 cycloalkyl group, a substituted or unsubstituted C1 to C30 alkylsilyl group, or a substituted or unsubstituted C1 to C30 alkylsilyloxy group.

3. The electrolyte for a lithium secondary battery of claim 1, wherein the compound represented by Chemical Formula 1 is one selected from fluorosulfonyl isocyanate, sulfuryl diisocyanate, 3-(triethoxysilyl)propyl isocyanate, 1,3-diisocyanato-1,1,3,3-tetramethyldisiloxane), and a combination thereof.

4. The electrolyte for a lithium secondary battery of claim 1, wherein:
    the borate-based lithium salt is included in an amount of 0.05 wt % to 20 wt % based on a total weight of the electrolyte, and
    the compound represented by Chemical Formula 1 is included in an amount of 0.05 wt % to 10 wt % based on a total weight of the electrolyte.

5. The electrolyte for a lithium secondary battery of claim 1, wherein the compound represented by Chemical Formula 1 is included in an amount of 1 to 20 parts by weight based on 100 parts by weight of the borate-based lithium salt.

6. The electrolyte for a lithium secondary battery of claim 1, wherein the additive further comprises at least one additional additive, the additional additive including vinylethylene carbonate (VEC), fluoroethylene carbonate (FEC), propenesultone (PST), propanesultone (PS), lithium tetrafluoroborate (LiBF$_4$), lithium bis(oxalato)borate (LiBOB), succinonitrile (SN), lithium difluorophosphate (LiPO$_2$F$_2$), 2-fluoro biphenyl (2-FBP), or a combination thereof.

7. The electrolyte for a lithium secondary battery of claim 6, wherein the at least one additional additive is included in an amount of 0.1 wt % to 10 wt % based on a total weight of the electrolyte for a lithium secondary battery.

8. A lithium secondary battery, comprising
    a positive electrode;
    a negative electrode; and
    the electrolyte of claim 1.

* * * * *